United States Patent [19]

Aviles et al.

[11] Patent Number: 5,235,574
[45] Date of Patent: Aug. 10, 1993

[54] OPTICAL DISK DRIVE RELATIVE POSITION SENSOR

[75] Inventors: Henry E. Aviles; Edwin R. Childers; James L. Overacker; Ronald P. Stahl, all of Tucson, Ariz.

[73] Assignee: International Business Machines Corporation, Armonk, N.Y.

[21] Appl. No.: 787,205

[22] Filed: Nov. 4, 1991

[51] Int. Cl.⁵ .............................................. G11B 17/22
[52] U.S. Cl. .................................... 369/32; 369/44.32; 369/44.23; 369/44.35; 369/54
[58] Field of Search .................... 369/32, 275.1, 275.2, 369/44.17, 44.31, 44.23, 44.32, 44.35, 54

[56] References Cited

U.S. PATENT DOCUMENTS

| | | | |
|---|---|---|---|
| 3,093,252 | 6/1963 | Cahill | 214/16 |
| 3,288,024 | 11/1966 | Cronquist et al. | 88/24 |
| 3,400,843 | 9/1968 | Johnson | 214/309 |
| 4,005,260 | 1/1977 | Janssen | 358/128 |
| 4,075,669 | 2/1978 | Louzil et al. | 360/92 |
| 4,386,382 | 5/1983 | Cutler et al. | 360/92 |
| 4,582,990 | 4/1986 | Stevens | 250/328 |
| 4,721,850 | 6/1988 | Sakai et al. | 369/44.31 |
| 4,768,179 | 8/1988 | Gottfried | 369/44.17 |
| 4,834,310 | 5/1983 | Schatteman | 360/92 |
| 4,883,401 | 11/1989 | Kavieff | 414/27.3 |

Primary Examiner—Robert J. Pascal
Assistant Examiner—R. A. Ratliff
Attorney, Agent, or Firm—M. W. Schecter

[57] ABSTRACT

An optical disk drive is disclosed in which sensing the position of a tilting prism driven by a fine tracking actuator uses the optical beam prior to its interaction with an optical disk. The optical beam emitted by a laser is redirected by the tilting prism. Most of the optical beam is reflected by the tilting prism in a direction through an objective lens for focused interaction with an optical disk, assuming a disk is mounted in the optical disk drive. The remainder of the optical beam is transmitted through the tilting prism, including any offset of the beam resulting from the refraction characteristics of the tilting prism, and received by a split far field detector. The split far field detector measures the offset of the optical beam which is a direct measure of the rotational position of the tilting prism. A relative position error signal is then generated and input to the coarse tracking actuator to coordinate its operation with that of the fine tracking actuator.

18 Claims, 2 Drawing Sheets

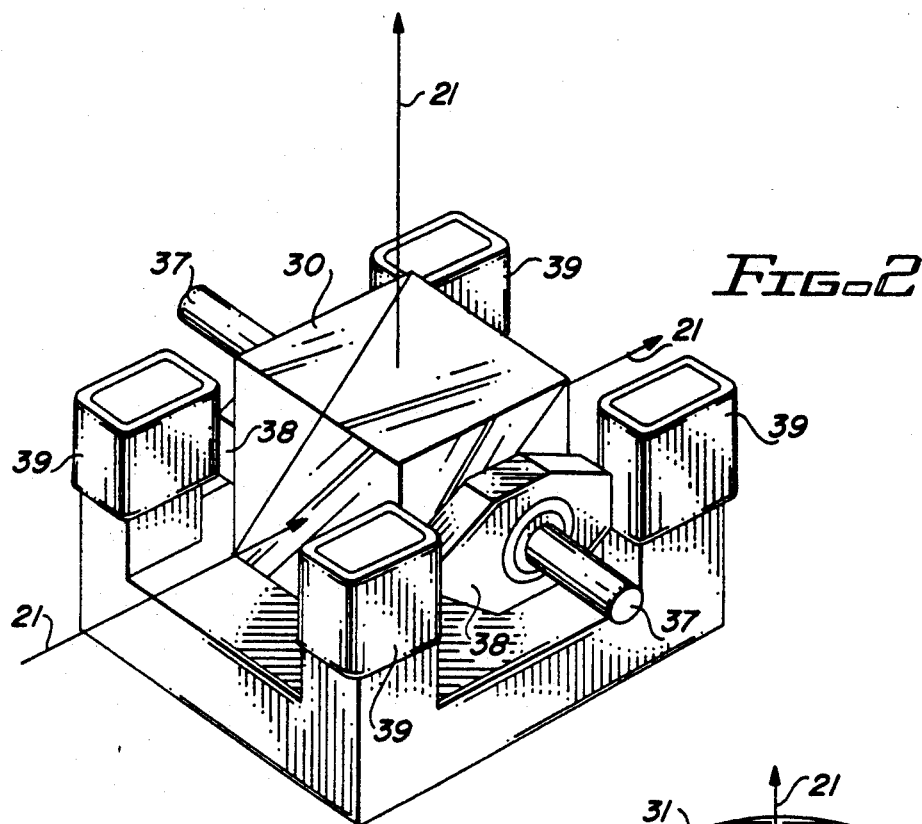
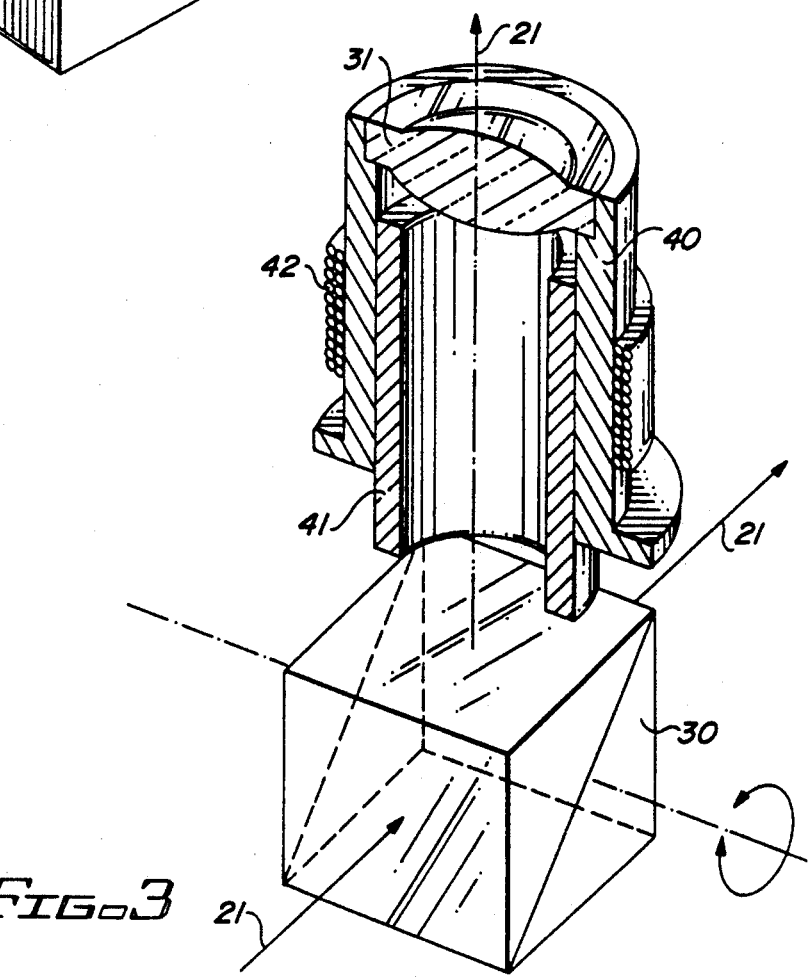

OPTICAL DISK DRIVE RELATIVE POSITION SENSOR

BACKGROUND OF THE INVENTION

1. Field of the Invention

This invention relates to the relative positioning of a first component movably mounted upon a second component. More particularly the invention relates to the coordination of the operation of coarse and fine actuators. such as coarse and fine tracking actuators used in optical disk drives.

2. Description of the Related Art

Optical disk drives, including compact audio disk players and computer data storage devices, employ a collimated beam of light to write to and/or read from a disk rotatably mounted therein. The beam is typically generated by a laser and passes through a series of optical components before the beam is used to change one or more local characteristics thereof. For reading data from the disk, the beam may be transmitted through or reflected from the disk such that the characteristics of the transmitted or reflected beam depends upon the local characteristics of the area of the disk with which the beam interacts.

Data is generally arranged on optical disks in either of two configurations. The first configuration is a series of concentric circular tracks. Random access to a particular area of the disk (and thus to particular data) is accomplished by radially seeking the optical beam across the tracks until the desired track is located, and then following such desired track until the particular area of the disk is reached. The second configuration is a single, spiral track. Random access to the spiral track is accomplished in a manner similar to that for circular tracks. The optical beam seeks across the boundaries of adjacent spiral track revolutions to radially locate the desired revolution of the spiral. and then follows such revolution until the particular area of the disk is reached. Hereafter. it will be understood that reference to "tracks" on an optical disk also includes the revolutions of a single, spiral track.

The tracks on an optical disk are randomly accessed and followed by a servo system which includes coarse and fine tracking actuators. The coarse tracking actuator may be, for example, a voice coil motor arranged to controllably move certain optical components radially (across tracks) with respect to the disk. The motion of the coarse actuator allows for access to any track on the disk. The fine tracking actuator may be a motor operatively coupled to controllably move some of the optical components also moved by the coarse tracking actuator. For example, the optical beam emitted by a laser may be redirected by a mirror or prism through an objective lens and into focused interaction with an optical disk. The coarse tracking actuator may drive both the mirror/prism and the objective lens radially with respect to the disk. The fine actuator may simply drive the objective lens, but not the mirror/prism, radially with respect to the disk. The motion of the fine actuator allows for access to a particular track within certain range of tracks In an alternative arrangement, the fine actuator may instead controllably tilt the mirror/prism. Registration of the optical beam to the tracks is optically sensed after the beam is transmitted through or reflected from the disk, as disclosed in U.S. Pat. No. 4,745,588.

In a simple tracking servo system, the fine tracking actuator compensates for track misregistration of the optical beam. Track misregistration may be caused, for example, by radial disk runout. If the track misregistration of the coarse tracking actuator is large enough the optical beam may be far enough out of its ideal path that certain problems arise. For example the path of the optical beam may not be aligned within a certain tolerance to the axis of the objective lens used to focus the beam upon a disk. The size and performance requirements of an objective lens in an optical disk drive are such that it can only be sized to adequately focus a properly positioned beam. If the offset or angle of the optical beam with respect to the objective lens or other optical components becomes too great the performance of the drive will degrade. A tracking servo system is thus most effective when the operation of the coarse and fine tracking actuators are coordinated to limit the size of the offset/angle.

By making the coarse tracking actuator closely follow the fine tracking actuator the optical beam is maintained in a nearly ideal path through the optical components. Such coordination requires accurate, stable sensing of the relative position of the optical components driven by the fine tracking actuator with respect to the position of the component driven by the coarse tracking actuator, and accurate adjustment of their relative positions. One technique for such relative position sensing is disclosed in U.S. Pat. No. RE29.963. The sensing system measures the average current provided to the fine actuator motor coil. The average current is related to the displacement of the optical components and is used to control the coarse tracking actuator. This technique is inexpensive but also inefficient, and thus fails to provide the bandwidths necessary for high performance optical disk drives.

Another perceivable technique for the aforementioned relative position sensing is to physically monitor the movement of the fine tracking actuator servo motor. However, the cost and complexity associated with the additional electronics required is not practical. Yet another technique for the aforementioned relative position sensing is disclosed in U.S. Pat. No. 4,864,552. The optical beam reflected from a disk is transmitted back through an objective lens driven by a fine tracking actuator, through a beam splitter and received by a split detector. The difference between the signals produced by each half of the split detector indicates the relative alignment of the objective lens with respect to the optical components driven by the coarse tracking actuator. This information is used to produce a drive signal which is then applied to the coarse tracking actuator to coordinate its operation with respect to that of the fine tracking actuator.

Two problems are associated with the determination of the relative position of the optical components by sensing the optical beam after it is reflected from a disk. First, an optical disk or similar calibration device must be present in the optical disk drive to align the optical components driven by the fine tracking actuator to those driven by the coarse tracking actuator. Second, the intensity of the optical beam used for relative position sensing is attenuated in its travel to and from the disk, and the intensity of the beam used for reading and tracking is attenuated by the beam splitter. In addition, this technique requires the use of an additional optical component, a lens which focuses the reflected optical beam onto the split detector.

SUMMARY OF THE INVENTION

In view of the foregoing, it is the principal object of this invention to improve the detection of the relative position of one component to another component upon which it is movably mounted.

Another object of this invention is to improve optical storage devices.

Still another object of this invention is to improve the coordination of the operation of the coarse and fine tracking actuators in an optical disk drive.

These and other objects of this invention are accomplished in an optical disk drive in which sensing the position of a tilting prism driven by a fine tracking actuator uses the optical beam prior to its interaction with an optical disk. The optical beam emitted by a laser is redirected by the tilting prism. Most of the optical beam is reflected by the tilting prism in a direction through an objective lens for focused interaction with an optical disk assuming a disk is mounted in the optical disk drive. The remainder of the optical beam is transmitted through the tilting prism, including any offset of the beam resulting from the refractive characteristics of the tilting prism, and received by a split far field detector. The split detector measures the offset of the optical beam, which is a direct measure of the rotational position of the tilting prism. A relative position error signal is then generated and input to the coarse tracking actuator to coordinate its operation with that of the fine tracking actuator.

The invention has several advantages in comparison to other techniques for coordinating the operation of the coarse and fine tracking actuators in an optical disk drive. The invention is inexpensive and simple to implement. Further, the invention does not require that an optical disk be present in a drive to align the components driven by the respective coarse and fine tracking actuators. Still further, relative position sensing occurs early in the optical path, thereby reducing problems associated with beam attenuation. In addition, only a split detector, or other equivalent device, is required for relative position sensing. Because the split detector may be the same type of device as is used for measuring track misregistration, further cost reductions are achieved. Finally, the invention achieves coordination of the operation of the coarse and fine tracking actuators with sufficient bandwidth as to make it effective in modern high performance optical storage devices.

The foregoing and other objects, features, and advantages of the invention will be apparent from the following more particular description of the preferred embodiment of the invention, as illustrated in the accompanying drawing.

BRIEF DESCRIPTION OF THE DRAWING

FIG. 2 is a magnified, isometric view of the tilting prism and fine tracking actuator of the optical disk drive of FIG. 1.

FIG. 3 is a magnified, isometric view of the tilting prism, objective lens and focus actuator of the optical disk drive of FIG. 1.

DESCRIPTION OF THE PREFERRED EMBODIMENT

Figure 1:
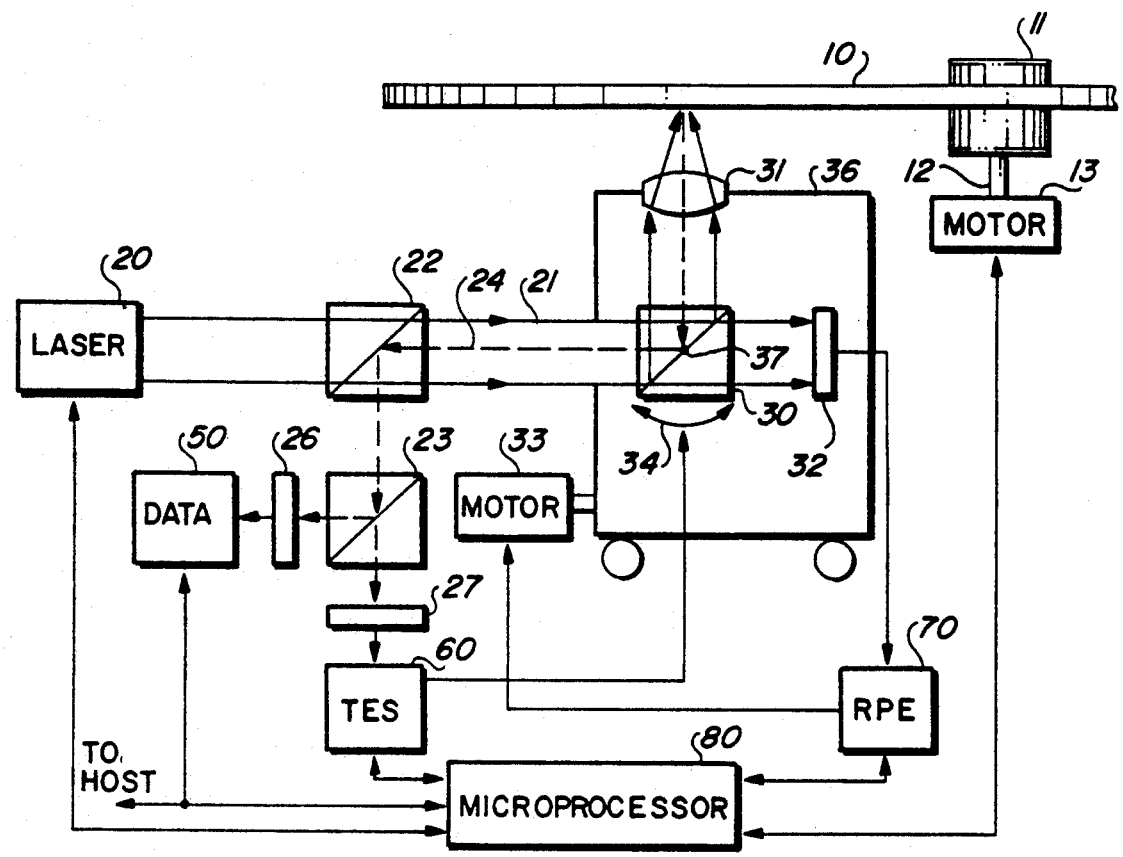
FIG. 1 is a schematic of an optical disk drive according to the invention.

Referring now more particularly to the drawing, like numerals denote like features and structural elements in the various figures. The invention will be described as embodied in an optical disk drive. In the preferred embodiment, the optical disk drive is a rewritable, magnetic-optic disk drive. The drawing illustrates such a drive only to the extent necessary to teach the subject invention. The remaining features of the optical disk drive, including additional optical and electrical components and their operation, are either irrelevant to such a teaching, or are well known. A further description of some of these features can be found in commonly assigned, co-pending U.S. patent application Ser. No. 07/589,710, hereby incorporated by reference. In alternative embodiments the optical disk drive may be read-only or write-once, and may use known recording technology, such as ablative or phase-change recording.

Referring to FIG. 1, a portion of an optical disk 10 is shown mounted in the optical disk drive. Disk 10 includes a hub 11 for easy mounting upon a spindle 12 which is rotatably driven by a spindle motor 13. A laser (including associated optical components) 20 emits a coherent, collimated optical beam the path of which is denoted by numeral 21 when generally proceeding toward disk 10 (upward or to the right as shown in the figure). Upon emission by laser 20, beam 21 is transmitted through a beam splitter 22. Beam 21 then reflects off of a tilting prism 30 and is transmitted through an objective lens 31 where it is focused upon disk 10. Tilting prism 30 is optically tuned to reflect most (over 90%) of beam 21, but a small portion of the beam is transmitted therethrough and is received by a split far field detector 32.

The portion of beam 21 which is refracted through tilting prism 30 goes directly from laser 20 to detector 32 without reflecting off of tilting prism 30 or disk 10. Detector 32 has two photoelements which sense the intensity of beam 21. The relative intensities depend upon the rotational position of tilting prism 30. A differential amplifier is used to determine the rotational position of tilting prism 30. To remove variations caused by the power level of laser 20, the output of the differential amplifier may be normalized by the total signal level at detector 32. The result is output to a set of relative position error (RPE) circuits 70. Based on the result. RPE circuits 70 signal a coarse tracking actuator 33 to adjust the position of carriage 36. Coarse tracking actuator 33 is a linear voice coil motor which drives carriage 36 (including tilting prism 30 objective lens 31 and fine tracking actuator 34) in a radial direction with respect to disk 10.

In an alternate embodiment, the invention could be included in a dual beam optical disk drive which uses different wavelengths for each beam, such as an optical direct-read-after-write (DRAW) disk drive. DRAW devices use a high power beam for writing and a separate low power beam for reading. In such devices tilting prism 30 could be optically tuned to totally reflect the write beam, but allow a portion of the read beam to be transmitted therethrough. Such tuning allows the read beam to be used for coordinating the operation of the coarse tracking actuator relative to the fine tracking actuator, yet preserves write beam power efficiency.

After reflection from disk 10, the path of the optical beam is identified by a dotted-line denoted by numeral 24 (proceeding downward or to the left as shown in the figure). Beam 24 reflects off of tilting prism 30 and is directed back towards beam splitter 22 and another beam splitter 23. Beam splitters 22 and 23 are optically tuned to reflect a portion of beam 24 towards two detectors 26 and 27.

Detector 26 is the data read detector, and actually includes several components (not shown for convenience). For example, a beam splitter, a pair of polarizers and photodetectors, and a differential amplifier can be used. The beam splitter divides the beam into two equal intensity beams. The first beam output by the beam splitter is directed towards a first polarizer and photodetector and the second beam emitted by the beam splitter is directed toward the second polarizer and photodetector. The first polarizer is set to pass only that light rotated when the optical path reflects from a spot on disk 10 having a first binary orientation. The light which passes through the first polarizer is received by the first photodetector. The second polarizer is set to pass only that light rotated when the optical path reflects from a spot on disk 10 having a second binary orientation. The light which passes through the second polarizer is received by the second photodetector. The signals generated by the photodetectors are each output to a differential amplifier. The amplifier then provides the resulting difference signal representing data recorded on disk 10 to a set of data circuits 50. Data circuits 50 include circuits for format control, error detection and correction, etc. The output of data circuits 50 may be transferred directly to a host processor over a suitable bus.

Detector 27 actually includes a quad detector with four photoelements and a split far field detector with two photoelements similar to detector 32. Focusing of beam 21 upon disk 10 is maintained by comparing the relative intensities detected by the four photoelements of the quad detector. Such a comparison is performed by a set of focus error signal circuits which are coupled to a focus actuator to form a focus servo. The focus detector, circuits, and focus actuator are not shown in FIG. 1 for convenience.

Tracking of beam 21 upon disk 10 is maintained by comparing the relative intensities detected by the two photoelements of the split far field detector and amplifying the difference in a set of tracking error signal (TES) circuits 60, as described with respect to detector 32. TES circuits 60 are coupled to a fine tracking actuator 34 to employ the amplified difference to align beam 21 with a track center line. The tracks on disk 10 may be formed by lands, grooves, or other known techniques.

The aforementioned components operate under the control of one or more microprocessors 80. Microprocessor(s) 80 is coupled to spindle 12 and spindle motor 13 for rotational position sensing of spindle 12, and for directing spindle motor 13 to rotate spindle 12 at a desired velocity to control access to the data segments on disk 10. Microprocessor(s) 80 is coupled to data circuits 50 to control data reading operations, and to the host to accept commands therefrom to write data to or read data from disk 10. Microprocessor(s) 80 is coupled to TES circuits 60 and RPE circuits 70 to monitor and control the servo operations.

The optical path shown in FIG. 1 is merely exemplary. It will thus be understood by those of ordinary skill that the optical path may be physically arranged differently than as shown, provided that the portion of beam 21 transmitted through tilting prism 30 is used to sense the relative position of prism 30 upon carriage 36 and coarse actuator 33. Also, in alternative embodiments, different optical components than those shown may be used. For example, tilting prism 30 could be a tilting mirror.

Referring to FIG. 2, fine tracking actuator 34 will now be described. Tilting prism 30 and two magnets 38 are affixed together and rotatably mounted about shaft 37. One or more electric coils 39 are actuated by TES circuits 60 to interact with magnets 38. The interaction causes prism 30 to rotate about an axis. In conjunction with the entire tracking servo, the direction of beam 21 reflected from and refracted through tilting prism 30 can be adjusted. The direction of beam 21 reflected from tilting prism 30 is controlled to seek to and/or follow tracks on disk 10. The direction of beam 21 refracted through tilting prism 30 is used to coordinate the operation of coarse tracking actuator 33 and fine tracking actuator 34.

Referring to FIG. 3, the relationship between tilting prism 30 and objective lens 31 will now be described. Fine tracking actuator 34 is not shown in the figure. Objective lens 31 is cradled in a lens support tube 40 which is slidably (or flexurably) mounted upon a cylinder 41. The portion of beam 21 which is reflected by tilting prism 30 is directed through the center of cylinder 41 and then through objective lens 31. Focus actuator motor coils 42 are controlled to cause lens support tube 40, and thus also objective lens 31, to move linearly toward or away from disk 10. In conjunction with the entire focus servo, beam 21 is maintained focused upon the active layer of disk 10.

Figure 4:
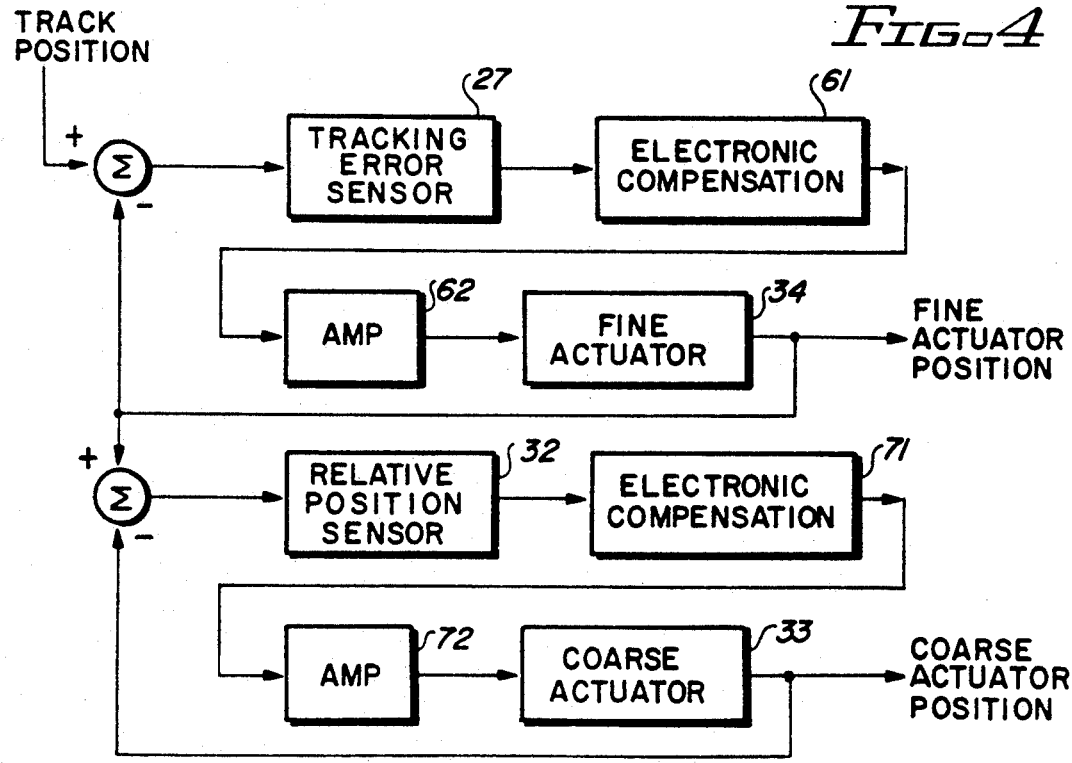
FIG. 4 is a schematic block diagram of the interaction of the TES and RPE circuits of the optical disk drive of FIG. 1.

Referring to FIG. 4, the interaction between TES circuits 60 and RPE circuits 70 will now be described. Note that FIG. 4 is schematic and is not intended to show every functional circuit as such are not relevant to the subject invention. The position of beam 21 with respect to a track, depending upon the positions of tilting prism 30 and carriage 36 is sensed by detector 27 which subtracts the signal from one photoelement from that of the other photoelement and outputs a signal to TES circuits 60. TES circuits 60 include a compensator 61 and an amplifier 62. The position of tilting prism 30 relative to carriage 36 is sensed by detector 32 which outputs a signal to RPE circuits 70. RPE circuits 70 include a compensator 71 and an amplifier 72. Compensators 61 and 71 provide phase margin in their respective servo loops. Amplifiers 62 and 72 drive actuators 34 and 33 respectively. Thus, the position of beam 21 with respect to the desired track is used to adjust the input to fine tracking actuator 34 and the position of tilting prism 30 relative to carriage 36 is used to adjust the input to coarse tracking actuator 33. In such a manner, the operation of the coarse and fine tracking actuators is coordinated to maintain the beam offset/angle within acceptable limits with respect to the desired track.

In operation, detector 32 and RPE circuits 70 may be used with or without disk 10. Without disk 10 in the optical disk drive, the arrangement described may be used to initialize the position of coarse actuator 33 and carriage 36 so that there is no offset/angle of beam 21 with respect to objective lens 31. Such initialization may be particularly useful during manufacturing of the optical disk drive. With disk 10 inserted in the optical disk drive, the arrangement described may be used to maintain the offset/angle of beam 21 with respect to objective lens 31 within an acceptable tolerance during writing to and/or reading from disk 10.

While the invention has been described with respect to a preferred embodiment thereof, it will be understood by those skilled in the art that various changes in detail may be made therein without departing from the spirit scope, and teaching of the invention. For example, although the invention has been described as embodied in an optical disk drive, it could be employed in other devices, including other types of optical storage devices. Accordingly, the invention disclosed herein is to be limited only as specified in the following claims.

What is claimed is:

1. A system for measuring the relative displacement of a first component with respect to a second component upon which the first component is movably mounted, the system comprising:
   means for emitting a beam a first portion of which reflects off of the first component and a second portion of which refracts through the first component; and
   means for detecting the offset of the second portion of the beam caused solely by the relative movement of the first component with respect to the second component, the means for detecting including means for removing variations in a detected offset caused by the means for emitting, there being no reflection of the beam off of the first component in the path of the beam from the means for emitting to the means for detecting.

2. The system of claim 1 wherein the means for emitting is not mounted on the second component.

3. The system of claim 1 wherein the means for emitting is a coherent, collimated light source.

4. The system of claim 3 wherein the first component is a tilting prism.

5. The system of claim 3 wherein the first component is a tilting mirror.

6. The system of claim 1 wherein the means for detecting is mounted on the second component.

7. The system of claim 1 wherein the means for detecting is a split far field detector.

8. A system for measuring the relative displacement of a first component with respect to a second component upon which the first component is tiltably mounted, the system comprising:
   a light source for emitting an optical beam a first portion of which reflects off of the first component and a second portion of which refracts through the first component; and
   a split far field detector for detecting the offset of the second portion of the optical beam caused solely by the relative movement of the first component with respect to the second component, the split far field detector including means for removing variations in a detected offset caused by the light source, there being no reflection of the optical beam off of the first component in the path of the optical beam from the collimated light source to the split far field detector, the far field detector mounted on the second component.

9. A system for positioning a coarse actuator in an optical storage device, the system comprising:
   an optical component movably coupled to a fine actuator and mounted upon a carriage movably coupled to the coarse actuator;
   a light source for emitting an optical beam a first portion of which reflects off of the optical component and a second portion of which reflects through the optical component;
   means for detecting the offset of the second portion of the optical beam caused solely by the relative movement of the optical component with respect to the carriage, the means for detecting including means for removing variations in a detected offset caused by the light source, there being no reflection of the optical beam off of the optical component in the path of the optical beam from the light source to the means for detecting; and
   means for adjusting the coarse actuator coupled to the output of the means for detecting.

10. The system of claim 9 wherein the light source is not movably coupled to the coarse actuator.

11. The system of claim 9 wherein the optical component is a tilting prism.

12. The system of claim 9 wherein the optical component is a tilting mirror.

13. The system of claim 9 wherein the means for detecting is movably coupled to the coarse actuator.

14. The system of claim 9 wherein the means for detecting is a split far field detector.

15. An optical drive comprising:
   an objective lens movably mounted on a focus actuator;
   a coarse tracking actuator;
   a fine tracking actuator;
   an optical component movably coupled to the fine tracking actuator and mounted upon a carriage movably coupled to the coarse tracking actuator;
   a light source for emitting an optical beam a first portion of which reflects off of the optical component and through the objective lens and a second portion of which refracts through the optical component;
   means for detecting the offset of the second portion of the optical beam caused solely by the relative movement of the optical component with respect to the means for detecting including means for removing variations in a detected offset caused by the light source, the means for detecting movably coupled to the coarse tracking actuator; and
   means for adjusting the coarse tracking actuator coupled to the output of the means for detecting.

16. The optical disk drive of claim 15 further comprising a split far field detector for measuring track misregistration.

17. The optical disk drive of claim 15 further comprising means for controlling the light source to read data from a disk mounted in the optical disk drive.

18. The optical disk drive of claim 15 wherein the means for detecting is a split far field detector.

* * * * *

UNITED STATES PATENT AND TRADEMARK OFFICE
CERTIFICATE OF CORRECTION

PATENT NO. : 5,235,574
DATED : August 10, 1993
INVENTOR(S) : Henry E. Aviles, et al.

It is certified that error appears in the above-identified patent and that said Letters Patent is hereby corrected as shown below:

At column 8, line 8, the words "which reflects" should be --which refracts--.

At column 8, line 47, the words "to the means for detecting" should be --to the carriage, the means for detecting--.

Signed and Sealed this

Nineteenth Day of April, 1994

*Attest:*

BRUCE LEHMAN

*Attesting Officer*  Commissioner of Patents and Trademarks